United States Patent
Shen et al.

(10) Patent No.: US 7,921,205 B2
(45) Date of Patent: Apr. 5, 2011

(54) WEBSITE LOAD TESTING USING A PLURALITY OF REMOTELY OPERATING AGENTS DISTRIBUTED OVER A WIDE AREA

(75) Inventors: Scott Shen, Framingham, MA (US); Imad Mouline, Braintree, MA (US); Arthur Mateos, Arlington, MA (US); Jason DeBettencourt, Medfield, MA (US)

(73) Assignee: Compuware Corporation, Detroit, MI (US)

( * ) Notice: Subject to any disclaimer, the term of this patent is extended or adjusted under 35 U.S.C. 154(b) by 372 days.

(21) Appl. No.: 12/102,534

(22) Filed: Apr. 14, 2008

(65) Prior Publication Data
US 2009/0055522 A1 Feb. 26, 2009

Related U.S. Application Data

(60) Provisional application No. 60/911,658, filed on Apr. 13, 2007.

(51) Int. Cl.
*G06F 15/16* (2006.01)
*G06F 15/173* (2006.01)
*G06F 15/177* (2006.01)

(52) U.S. Cl. ......... 709/224; 702/186; 702/182; 370/352

(58) Field of Classification Search .................. 709/238, 709/217–224; 370/352; 702/182, 186
See application file for complete search history.

(56) References Cited

U.S. PATENT DOCUMENTS

| 7,406,626 B2 * | 7/2008 | Shen et al. ..................... 714/38 |
| 7,630,862 B2 * | 12/2009 | Glas et al. ..................... 702/186 |
| 7,685,273 B1 * | 3/2010 | Anastas et al. ................ 709/224 |
| 2006/0276997 A1 * | 12/2006 | Drees ............................ 702/182 |
| 2007/0211696 A1 * | 9/2007 | Noble ........................... 370/352 |
| 2007/0211697 A1 * | 9/2007 | Noble ........................... 370/352 |

* cited by examiner

*Primary Examiner* — Haresh N Patel
(74) *Attorney, Agent, or Firm* — Fenwick & West LLP

(57) ABSTRACT

Website load testing using agents is disclosed. An address of a website and a window of time in which to perform a load test are received. The address and the window of time are distributed to a plurality of remotely operating agents, distributed over a wide area. Each agent in the plurality is to access the website at the received address during the window of time to load test the website. Data from the plurality of agents is received upon passage of the window of time, describing a load placed upon the website by the plurality of agents. The received data describing the load placed upon the website is presented. Alternatively, a script may be used to load test a website, the script a series of commands to be executed across the website as a simulation of a transaction, the script to be executed in the window of time.

23 Claims, 14 Drawing Sheets

FIG. 2A

WEBSITE LOAD TESTING USING A PLURALITY OF REMOTELY OPERATING AGENTS DISTRIBUTED OVER A WIDE AREA

PRIORITY TO EARLIER FILED PROVISIONAL PATENT APPLICATIONS

This application claims the benefit of the filing date of U.S. Provisional Patent Application Ser. No. 60/911,658, entitled "REALITY LOAD", filed on Apr. 13, 2007, which shares co-inventorship with the present application. The entire teachings and contents of this Provisional patent applications is hereby incorporated by reference herein in their entirety.

BACKGROUND

Computer systems coupled to a data communications network, such as the Internet, allow for the exchange of a wide variety of information between users of such computer systems. One popular use of computer networks, such as the Internet, allows users to operate client communications software, known as a browser, to communicate with remote computer systems, such as servers, in order to browse websites (i.e., collections of one or more web pages) on the World Wide Web. The World Wide Web is generally a collection of server computer systems that each operates server software that communicates using a number of different data communications protocols and data formats, to allow each user's browser to make web page requests to the servers. In response to these web page requests, servers obtain (e.g., from storage, or via dynamic generation) the requested web page(s) and serve those page(s) back to each user's browser for viewing by the user.

A typical website is written in a markup language, such as the Hypertext Markup Language (HTML), and includes a number of embedded objects referenced by respective Uniform Resource Locators (URLs) within the HTML code. The website itself is generally referenced by a URL, as well. When a user provides a URL to a browser, either by clicking a hyperlink identifying the URL, or by typing in the URL of the website, the browser performs a detailed sequence of processing tasks to obtain the web page or pages that comprise the website. As an example, if the URL of the website identifies a domain name of a server computer system on the Internet, the browser must first perform a Domain Name Service (DNS) lookup of the domain name to resolve this alphanumeric name into the Internet Protocol (IP) address of the server on the Internet that can serve the initial page of the website that is referenced by the URL. Once this DNS lookup is complete, the browser establishes a connection to the server (e.g., a Transmission Control Protocol or TCP connection) and uses a Hypertext Transport Protocol (HTTP) to transmit a web page GET request over the connection to the server. The HTTP GET request contains the URL of the web page to be served by the server. The server receives this HTTP GET request, obtains or dynamically generates the web page, and returns the web page as HTML to the browser in an HTTP response message over the connection.

As the web browser receives the HTML for the web page, the HTML of the web page may include many embedded objects. Within such objects, there may be URLs that define content for those objects to be obtained by the browser. As an example, a graphic or image embedded within the web page is typically referenced with an embedded URL that specifies a server, and location (e.g. filename and directory path) within that server, that contains the graphic or image. As the browser encounters such embedded objects within the web page, the browser repeats the sequence of processing described above to obtain the content of each embedded object. Modern web pages typically contain many embedded objects, which often specify different server computer systems from which to obtain the content for those objects. As a result, the process of obtaining the complete content associated with a website single comprising only a single web page (including all embedded objects) involves significant processing and communications activities.

In addition to simply viewing content, a user may also use a browser to visit a web site in order to perform one or more transactions within the website, such as purchasing goods or services. Sophisticated server software allows websites to provide such abilities to users. Performance of the transaction within a website typically involves the user operating the browser to navigate to an initial page of the website, such as the homepage of a commercial website. From the initial page, the user is able to further navigate, as needed, to other pages associated with the website in order to perform the transaction. For example, a user may navigate to a particular page to select a good or service to be placed into an electronic or virtual shopping cart maintained within the server of the website. When the user has completed the selection of goods and/or services the user wishes to purchase, the user may further navigate within the website to one or more web pages that allow the user to purchase the selected goods and/or services by entering payment information. The server software is able to process the payment information, and allow or deny the purchase of the selected goods and/or services to complete the transaction. Depending on the purpose of the website, a single transaction may thus involve visiting and providing user input to a sequence of many web pages. The web server often uses input from one or more pages to produce successive web pages in a given transaction.

Many organizations, such as corporations, universities and web-based businesses, rely heavily on their websites to be able to handle large loads (i.e., hundreds or thousands, or even more, "hits" on the site in a period of time) of traffic at any given time. Conventional tools to load test websites typically are of one of two types. The first type of conventional load testing tool is a hardware device that creates (i.e., simulates) network traffic representative of a typical load. The second type of conventional load testing tool is a number of software applications (i.e., agents) that are distributed throughout a local area (i.e., a local area network (LAN)) behind a firewall. Such a load testing tool is commonly used to load test a website prior to the website becoming publicly accessible.

SUMMARY

Conventional mechanisms such as those explained above suffer from a variety of deficiencies. One such deficiency is that neither conventional tool, be it hardware or software, is able to accurately represent test loads placed on a website that are comparable to actual loads. That is, both the conventional hardware tool and the conventional software tool use the same (or very similar) connections, typically very high-speed connections such as a T-1 line or above, to place loads on a website for testing purposes. Despite the growth of broadband network access in the United States, many households (and even some businesses) still rely on dial-up systems to access the Internet. Further, even among broadband users, connection speeds typically vary and in few instances are they as fast as those very high-speed connections used by the conventional load testing tools. Additionally, testing facilities that employ the conventional load testing tools typically include dedicated high-end computer systems for operating those testing tools, which contrasts with a typical website user's personal computer system, likely to include far less processing and memory resources.

Embodiments of the invention significantly overcome such deficiencies and provide mechanisms and techniques that load test a website using a plurality of agents that are remotely operating and are distributed over a wide area. That is, agents that perform the load testing service are located on various differing types of computer systems at varying geographical locations around the world. The varied placement of agents also results in agents that participate in the load testing having network connections of varying quality (i.e., bandwidth). That is, some agents may be located on computer systems that access a network (i.e., the Internet) via dial-up access, while some other agents may be located on computer systems that access a network via varying types of broadband connections (i.e., DSL modem, cable modem, WiFi, fiber optic network, etc. for residential customers, and high-speed connections such as T-1 lines or T-10 lines for business customers). The variations in computer systems, network connections, and geographical locations more closely simulate the actual load placed on a website by actual users conducting transactions at the same time or in the same window of time, as actual users of course all have different types of computer systems and network connections and are located in different geographical locations.

A user wishing to conduct a load test using embodiments described herein provides an address for a website, or a script that simulates a transaction on a website, along with a window of time in which to conduct the load test. This load test information is then distributed to a number of agents, which will conduct the load test by accessing the website and/or executing the script in the window of time. The agents monitor the responsiveness of the website, and gather this data and other data indicative of the load being placed on the website. This data is then presented back to the user for analysis. The types of agents used to perform the load test may include agents that request tasks only when those agents are available, as well as agents that are virtualized (i.e., created) specifically for the task of load testing a web site. Any agents used, whatever their other characteristics, are remotely operating and are distributed over a wide area.

More particularly, in an embodiment, there is provided a method of load testing a website using a plurality of agents. The method includes receiving an address of a website and a window of time in which a load test is to be executed, and distributing the address and the window of time to a plurality of remotely operating agents distributed over a wide area, each agent in the plurality of agents to access the website at the received address during the window of time to load test the website. The method also includes receiving data from the plurality of agents upon passage of the window of time, the data describing a load placed upon the website by the plurality of agents, and presenting the received data describing the load placed upon the website.

In a related embodiment, receiving may include receiving a script, wherein a script is a series of commands to be executed across a website as a simulation of a transaction, and a window of time in which the script is to be executed as a load test on the website, and distributing may include distributing the script and the window of time to a plurality of remotely operating agents distributed over a wide area, each agent in the plurality of agents to execute the script during the window of time to load test the website.

In another related embodiment, the method may include: prior to distributing, receiving a selection of agents to comprise the plurality of remotely operating agents distributed over a wide area, the selection of agents including agents grouped together according to one of geographic location and connection bandwidth. In a further related embodiment, presenting may include presenting the received data describing the load placed upon the website, the presented data broken down according to one of geographic location and connection bandwidth.

In yet another related embodiment, distributing may include distributing the address and the window of time to the plurality of remotely operating agents distributed over a wide area, each agent in the plurality of agents to access the website at the received address during the window of time to load test the website, the plurality of agents including agents connected to network connections of varying bandwidths. In yet still another related embodiment, the method may include, prior to distributing, determining agents to be included in the plurality of agents by: setting a criterion for an agent to be included in the plurality of agents, the criterion related to a characteristic of the agent or of a computer system including the agent; receiving a communication from available agents, each communication including information identifying a characteristic of the agent, or the computer system including the agent, that sent the communication; determining if the characteristic in a received communication matches the criterion, and in response, including that agent in the plurality of agents.

In still yet another related embodiment, distributing may include distributing the address and the window of time to a plurality of remotely operating agents distributed over a wide area, each agent in the plurality of agents to access the website at the received address during the window of time to load test the website, the plurality of agents including last-mile agents, a last mile agent requesting a task when the last mile agent is available. In yet still another related embodiment, distributing may include distributing the address and the window of time to a plurality of remotely operating agents distributed over a wide area, each agent in the plurality of agents to access the website at the received address during the window of time to load test the website, the plurality of agents including dynamically allocated virtualized agents, created as needed, the dynamically allocated virtualized agents receiving direct instructions at any time.

In yet still another related embodiment, the method may include assigning a priority to the load test such that agents within the plurality of agents that are assigned tasks other than the load test perform the load test prior to performing the other tasks. In still yet another related embodiment, the method may include, prior to receiving an address of a website and a window of time, presenting a display of already-scheduled load tests, the display assisting in determining a window of time for a load test to be executed.

In another embodiment, there is provided a computer program product, stored on computer readable medium, for load testing a website using a plurality of agents. The computer program product includes computer program code for receiving an address of a website and a window of time in which a load test is to be executed, and computer program code for distributing the address and the window of time to a plurality of remotely operating agents distributed over a wide area, each agent in the plurality of agents to access the website at the received address during the window of time to load test the website. The computer program product also includes computer program code for receiving data from the plurality of agents upon passage of the window of time, the data describing a load placed upon the website by the plurality of agents, and computer program code for presenting the received data describing the load placed upon the website.

In a related embodiment, computer program code for receiving may include computer program code for receiving a script, wherein a script is a series of commands to be executed across a website as a simulation of a transaction, and a window of time in which the script is to be executed as a load test on the website, and computer program code for distributing may include computer program code for distributing the script and the window of time to a plurality of remotely operating agents distributed over a wide area, each agent in the plurality of agents to execute the script during the window of time to load test the website.

In another embodiment, there is provided a computer system. The computer system includes a memory; a processor; a display; a network interface; and an interconnection mechanism coupling the memory, the processor, the display, and the network interface, allowing communication there between. The memory is encoded with an agent load testing application, that when executed in the processor, provides an agent load testing process that load tests a website using a plurality of agents. The agent load testing process causes the computer system to perform the operations of: receiving an address of a website and a window of time in which a load test is to be executed; distributing the address and the window of time to a plurality of remotely operating agents distributed over a wide area, each agent in the plurality of agents to access the website at the received address during the window of time to load test the website; receiving data from the plurality of agents upon passage of the window of time, the data describing a load placed upon the website by the plurality of agents; and presenting the received data describing the load placed upon the website.

In a related embodiment, receiving may include receiving a script, wherein a script is a series of commands to be executed across a website as a simulation of a transaction, and a window of time in which the script is to be executed as a load test on the website, and distributing may include distributing the script and the window of time to a plurality of remotely operating agents distributed over a wide area, each agent in the plurality of agents to execute the script during the window of time to load test the website.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing client management of download sequence of orchestrated content as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as but not limited to an optical medium (e.g., CD-ROM, DVD-ROM, etc.), floppy or hard disk, a so-called "flash" (i.e., solid state) memory medium, or other physical medium, such as but not limited to firmware or microcode in one or more ROM or RAM or PROM chips, or as an Application Specific Integrated Circuit (ASIC), or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities may also provide the system of the invention. The system of the invention may be distributed between many software processes on several data communications devices, or all processes may run on a small set of dedicated computers, or on one computer alone.

It is to be understood that embodiments of the invention may be embodied strictly as a software program, as software and hardware, or as hardware and/or circuitry alone. The features disclosed and explained herein may be employed in computerized devices and software systems for such devices such as those manufactured by Gomez, Inc. of Lexington, Mass.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIGS. 2A-2G illustrate examples screenshots generated during performance of any of the procedures depicted in FIGS. 3-8 for load testing a website using a plurality of agents distributed over a wide area.

DETAILED DESCRIPTION

Generally, disclosed embodiments provide methods and apparatus for load testing a website using a plurality of agents, particularly a plurality of remotely operating agents distributed over a wide area. The address of a website to be load tested is received, along with a window of time in which the load test is to occur. In some embodiments, alternatively, a script that simulates a transaction across a website is used instead of a website address. The website address/script and the window of time are passed on to the plurality of agents, which then run the load test on the website using the received information during the window of time. The agents monitor the responsiveness of the website, and collect this information along with other data, for presenting to the user. The user is able to view and analyze the data to determine how well (or not) the website handled the load created by the test. Agents used to test the website may be agents that request a task (such as participating in a load test) when they are available, as well as agents that are dynamically created (i.e., virtualized) specifically to load test a website. The network connections, computer systems, and geographic locations of the agents vary broadly.

Figure 1:
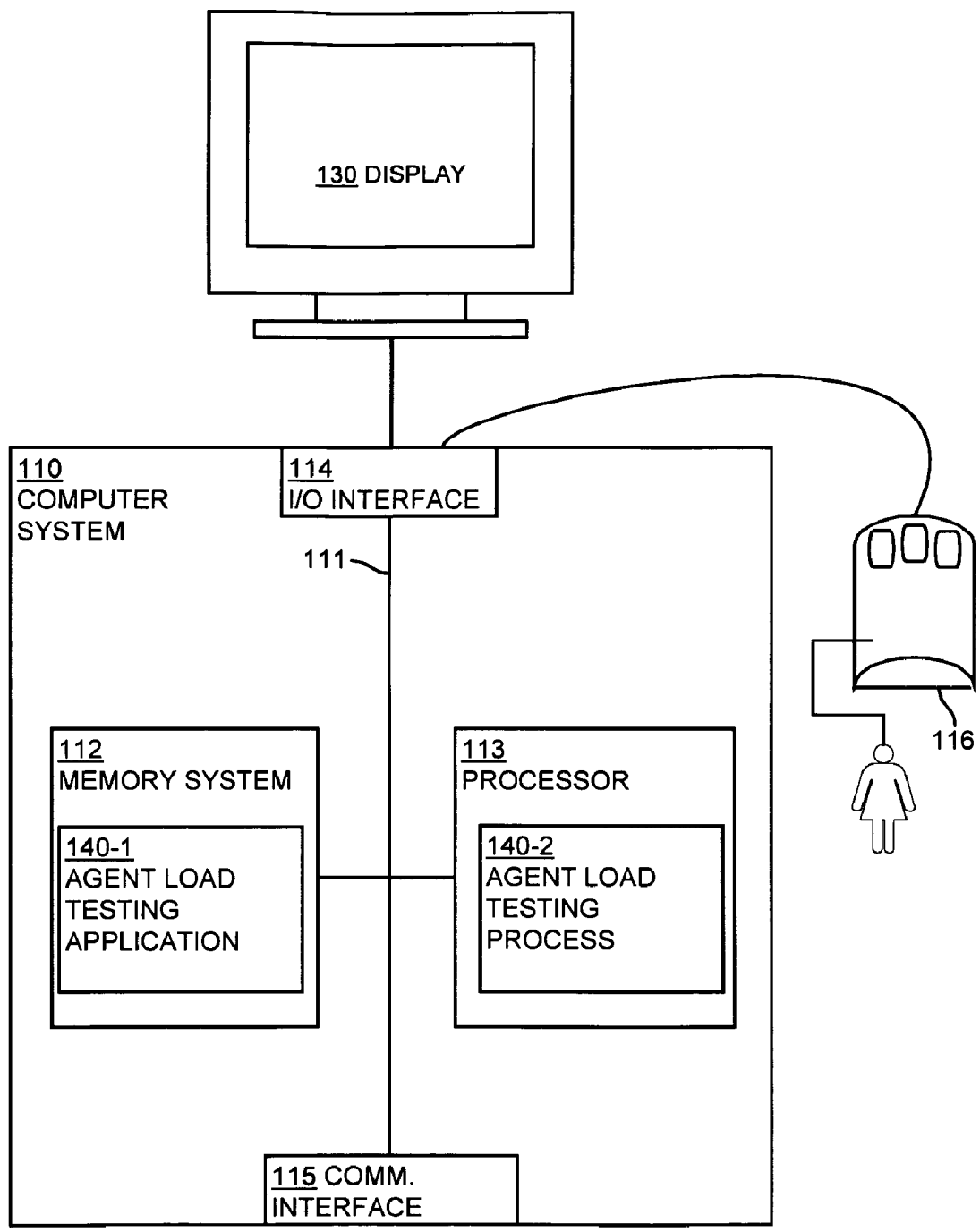
FIG. 1 shows a high-level block diagram of a computer system according to one embodiment disclosed herein.

More particularly, FIG. 1 is a block diagram illustrating example architecture of a computer system 110 that executes, runs, interprets, operates or otherwise performs an agent load testing application 140-1 and an agent load testing process 140-2 suitable for use in explaining example configurations disclosed herein. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user controlled devices such as a keyboard, mouse, touchpad, trackball, etc.) couples to the processor 113 through the I/O interface 114 and enables a user 108 such as a web page developer to provide input commands and generally control a graphical user interface 160 shown on a display 130. The communications interface 115 enables the computer system 110 to communicate with other devices (e.g., other computers) on a network (not shown in FIG. 1).

The memory system 112 is any type of computer readable medium and in this example is encoded with an agent load testing application 140-1. The agent load testing application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnection mechanism 111 in order to launch, run, execute, interpret or otherwise perform the logic instructions of the agent load testing application 140-1. Execution of the agent load testing application 140-1 in this manner produces processing functionality in an agent load testing process 140-2. In other words, the agent load testing process 140-2 represent(s) one or more portions or runtime instances of the agent load testing application 140-1 performing or executing within or upon the processor 113 in the computer system 110 at runtime.

It is noted that example configurations disclosed herein include the agent load testing application 140-1 itself including the agent load testing process 140-2 (i.e., in the form of unexecuted or non-performing logic instructions and/or data). The agent load testing application 140-1 may be stored on a computer readable medium (such as a floppy disk), hard disk, electronic, magnetic, optical or other computer readable medium. The agent load testing application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the agent load testing application 140-1 in the processor 113 as the agent load testing process 140-2. Those skilled in the art will understand that the computer system 110 may include other processes and/or software and hardware components, such as an operating system not shown in this example.

The display 130 need not be coupled directly to computer system 110. For example, the agent load testing application 140-1 may be executed on a remotely accessible computerized device via the network interface 115. In this instance, the graphical user interface 160 may be displayed locally to a user of the remote computer and execution of the processing herein may be client-server based.

FIGS. 2A-2G illustrate examples of various graphical user interfaces that may be shown on a display device, such as the display device 130 of FIG. 1, during the course of execution of the agent load testing application 140-1. FIGS. 2A-2G will be described in greater detail throughout the discussion of FIGS. 3-8 below.

FIGS. 3-8 are flowcharts of various embodiments of the agent load testing process 140-2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flowcharts do not depict the syntax of any particular programming language. Rather, the flowcharts illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 3:
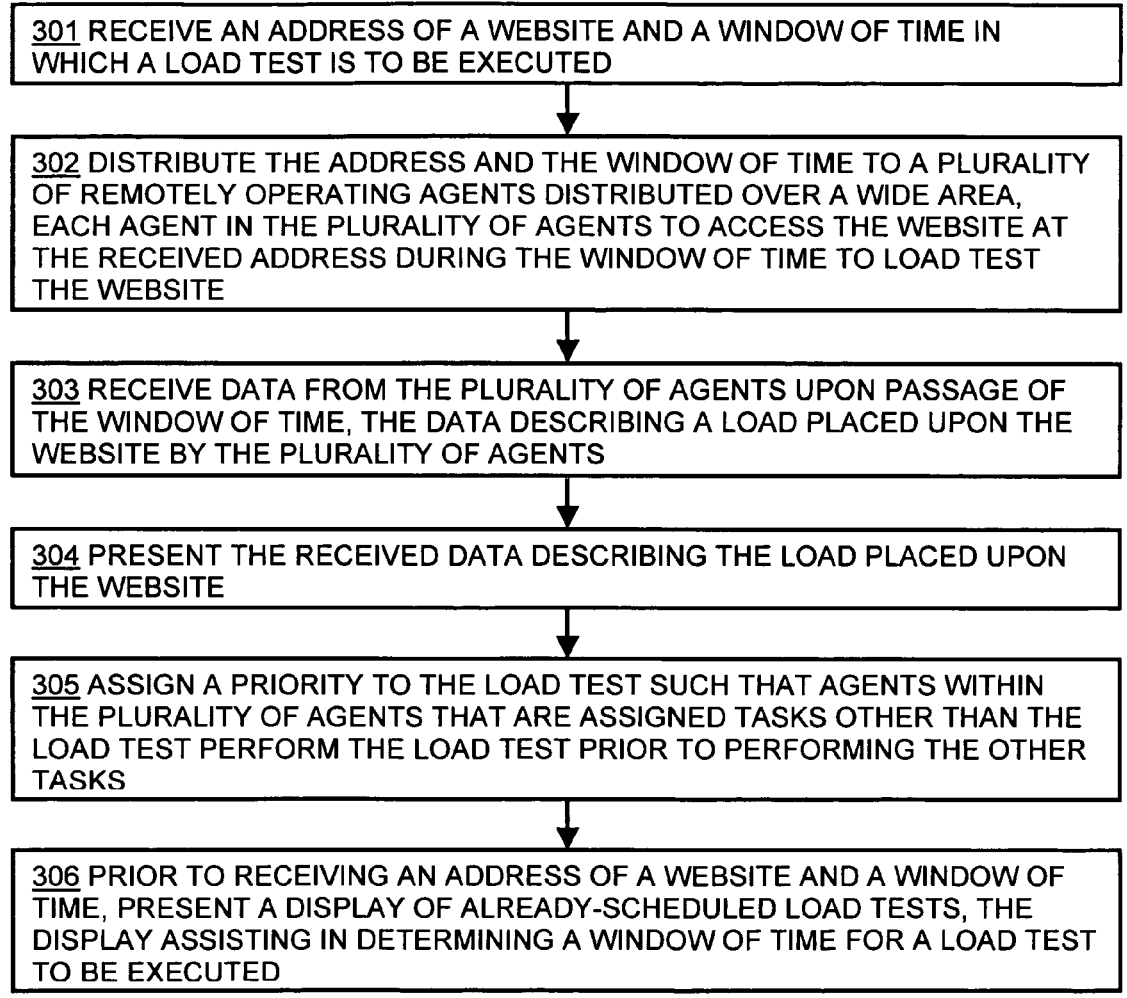
FIG. 3 illustrates a flowchart of a procedure performed by the system of FIG. 1 when load testing a website using a plurality of remotely operating agents distributed over a wide area.

FIG. 3 illustrates an embodiment of the agent load testing application 140-1, executing as the agent load testing process 140-2, to load test a website using a plurality of agents. A website may include one or more web pages containing content. Content may be, but is not limited to, any type of data capable of being transferred in response to a request for that data. In some embodiments, content is a web page stored on one or more servers and accessed through a request for the web page. The web page may include any type of known elements of content, such as but not limited to textual data, audio files, image files, video files, embedded elements such as a Javascript applet, HTML files, XML files, ASP files, and so on, as are well-known in the art of web pages. Note that a website may, in some embodiments, include one or more pages that is/are not currently accessible via the public Internet or World Wide Web, but rather is/are stored on a private network, such as a corporate intranet, accessible only to those with access to the private network.

Figure 2A:
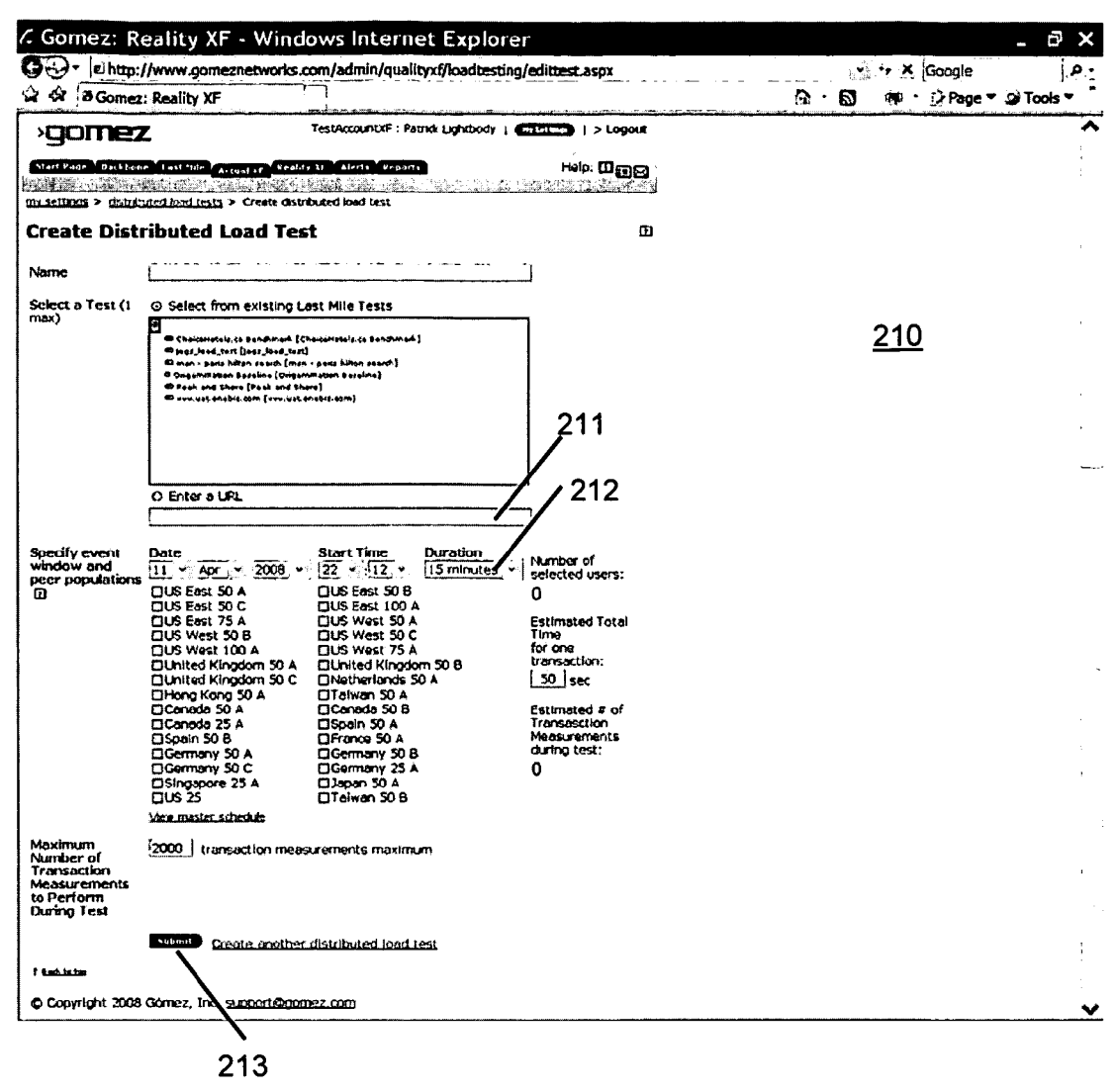

The agent load testing application 140-1, executing as the agent load testing process 140-2, may be accessed by a user via a remote graphical user interface provided by the agent load testing process 140-2, such as a graphical user interface 210 shown in FIG. 2A. The user accesses the remote graphical user interface through, for example, a browser application installed on the local computer system of the user. The browser application, via the remote graphical user interface, allows the user to interact with the agent load testing process 140-2. As seen in FIG. 2A, the graphical user interface 210 includes a text box element 211 and window of time entry elements 212. The text box element 211 allows a user to enter an address of a web page to be load tested to be provided to the agent load testing process 140-2. The window of time entry elements 212 allow a user to enter a window of time in which the load test is to occur; this is also provided to the agent load testing process 140-2. The user may use any type of input device to provide these inputs, and to then submit the inputs to the agent load testing process 140-2 (for example, by providing input to activate a submit button 213).

For example, the text box element 211 may contain any valid URL, while the window of time entry elements 212 may contain a valid date and time combination. In some embodiments, as shown in FIG. 2A, the time portion of the window of time may be provided by providing a start time for the load test and a duration for the load test to occur during. When the user provides input to activate the submit button 213, the agent load testing process 140-2 receives the address of a website and a window of time in which a load test is to be executed, step 301. That is, in the example according to FIG. 2A, the agent load testing process 140-2 will receive the URL that is located in the text box element 211, or whatever other address the user might enter, along with the date and time combination that is located in the window of time entry elements 212, or whatever other date and time combination the user might enter, when the user submits these pieces of information. Note that the agent load testing process 140-2 will not allow the user to submit an improperly formatted address for a web page. For example, the agent load testing process 140-2 would allow the user to submit the URL http://www.gomez.com, but would not allow the user to submit htp:\\www.gomez.com. If the user enters an address in an improper format, the agent load testing process 140-2 will inform the user of the error (for example, by a pop-up box, or by an error message located within the graphical user interface 210) and requests that the user re-enter the address in the proper format. Further, in some embodiments, the agent load testing process 140-2 is configured such that a load test is not executable in a window of time that is only a short amount of time in the near future from the current time. For example, if the current date and time are Apr. 6, 2008 and 2:45 PM, the agent load testing process 140-2 would not allow a user to submit a window of time for a load test to begin at 2:50 PM on Apr. 6, 2008. Having such a built-in-delay before a load test is able to begin allows a user to make changes or adjustments to the configuration of the load test, as described herein.

In some embodiments, the agent load testing process 140-2, prior to receiving an address of a website and a window of time, presents a display of already-scheduled load tests, the display assisting in determining a window of time for a load test to be executed, step 306. An example of such a presented display, which may be referred to as a master schedule, is a graphical user interface 230 shown in FIG. 2C. In some embodiments, a user may manipulate the display of the master schedule by performing functions such as zooming, zooming out, advancing to a next hour/day/segment of time, and the like. The master schedule may be useful to the user in selecting a window of time in which to schedule a load test. Further, the master schedule may be broken down in terms of groups of agents that are already scheduled to perform a load test, or another activity.

The agent load testing process 140-2 then distributes the address and the window of time to a plurality of remotely operating agents distributed over a wide area, each agent in the plurality of agents to access the website at the received address during the window of time to load test the website, step 302. Agents may be of two different types. One type of agent is known as a pull agent, in which the agent must request that it be given a task (such as by the agent load testing process 140-2) in order for the agent to perform a task. A second type of agent is known as a push agent, in which the agent accepts tasks directly and is capable of performing them upon request. Specific types of pull agents and push agents are described in greater detail herein.

Any agents used by the agent load testing process 140-2 in the plurality of agents are remotely operating agents. That is, the agent load testing process 140-2 may be remotely located from the plurality of agents, such that when the agent load testing process 140-2 sends any instructions to agents, those instructions are transmitted from the remote location of the agent load testing process 140-2 to wherever each agent in the plurality of agents is located. For example, in embodiments where the user of the agent load testing process 140-2 accesses the agent load testing process 140-2 via a web-based interface from the user's local computer system, the address of the website to be load tested (or a script, as described in FIG. 4 below) and the window of time in which to perform the load test are provided by the user through the web-based interface. Because the user is in a different (i.e., remote) location than the agents, the agents that are used by the agent load testing process 140-2 are thus remotely operating.

Further, agents used in the plurality of agents are distributed over a wide area. A wide area may include any region of space that could be connected by, for example, a wide area network instead of a local area network. For example, a plurality of agents distributed over a wide area would include some agents that are located in California and other agents that are located in New York State. Agents located in the same building in the same geographic location would not be considered agents distributed over a wide area. Agents located in different buildings in the same geographic location (e.g., town or city), where the buildings are separated, may be considered agents distributed over a wide area. By using agents distributed over a wide area, the agent load testing process 140-2 allows a user to more closely model actual loads placed upon a website during the normal course of website activity. That is, users who access a bank's website to manage their bank accounts are likely to vary greatly in terms of the computer systems and network connections they use, and are likely to be spread out over a geographic location. Having agents that mimic this kind of activity makes load tests conducted by the agent load testing process 140-2 more like actual loads, and thus data generated by the agent load testing process 140-2 has more real-world applicability than data generated by conventional load testing tools.

Due to their remotely operating, widely distributed nature, agents may operate on a variety of computer systems (i.e., different memory systems, different processors, different operating systems, different network connections, etc.) spread around the world. Alternatively, some agents may operate as dedicated agents on computer systems designed specifically for executing agents thereon. A user of the agent load testing process 140-2 may thus be able to, in some embodiments, select different grouping of agents to be used to conduct a load test; this is described in greater detail below with regards to FIG. 6. The user of the agent load testing process 140-2 may select such groupings using a graphical user interface 210 shown in FIG. 2A, where a groups of agents may be selected by a user providing input from an input device to active the checkbox next to that group of agents. Of course, any known graphical selection processes, or other selection processes, may be used. However groups of agents are selected to be included in the plurality of agents, the agent load testing process 140-2 receives this selection prior to distributing instructions to agents.

In some embodiments, the agent load testing process 140-2 allows a user to limit the maximum number of transactions (i.e., "hits") to a website. This is a particularly useful function for when the website being load tested is served from servers that are, due to physical limitations, only able to handle a certain amount of capacity. An example of a graphical element in which the user may enter such information is shown in FIG. 2A as well as beneath the master schedule in FIG. 2C.

The agent load testing process 140-2 then receives data from the plurality of agents upon passage of the window of time, step 303, the data describing a load placed upon the website by the plurality of agents. That is, when the window of time is over, and the agents have thus finished interacting with the website, the agents will have various data about the website. That data will describe the response time of the website, that is, how long the website took to respond to each agent. That data may also show how many agents attempted to simultaneously access the website, at a given point in time. Further, that data may show the maximum amount of network traffic sent by agents to the website at a given point in time. For purposes of displaying the data, in some embodiments, it is possible to break the data down by agents/groups of agents depending on agent characteristics, as described herein.

Figure 2B:
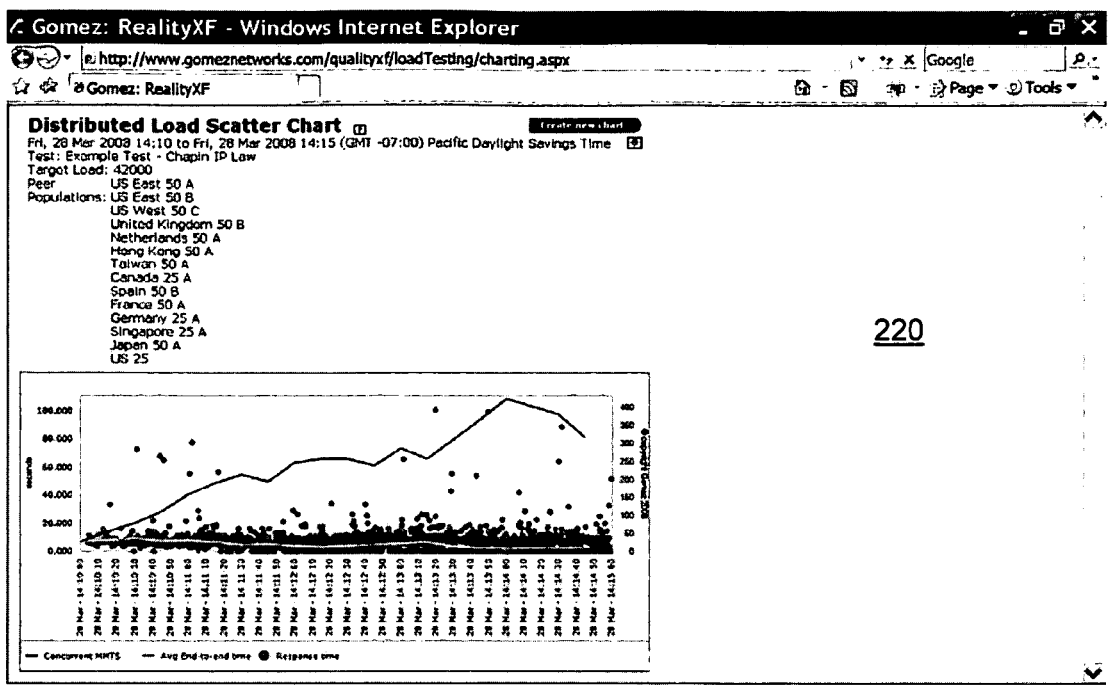
Figure 2C:
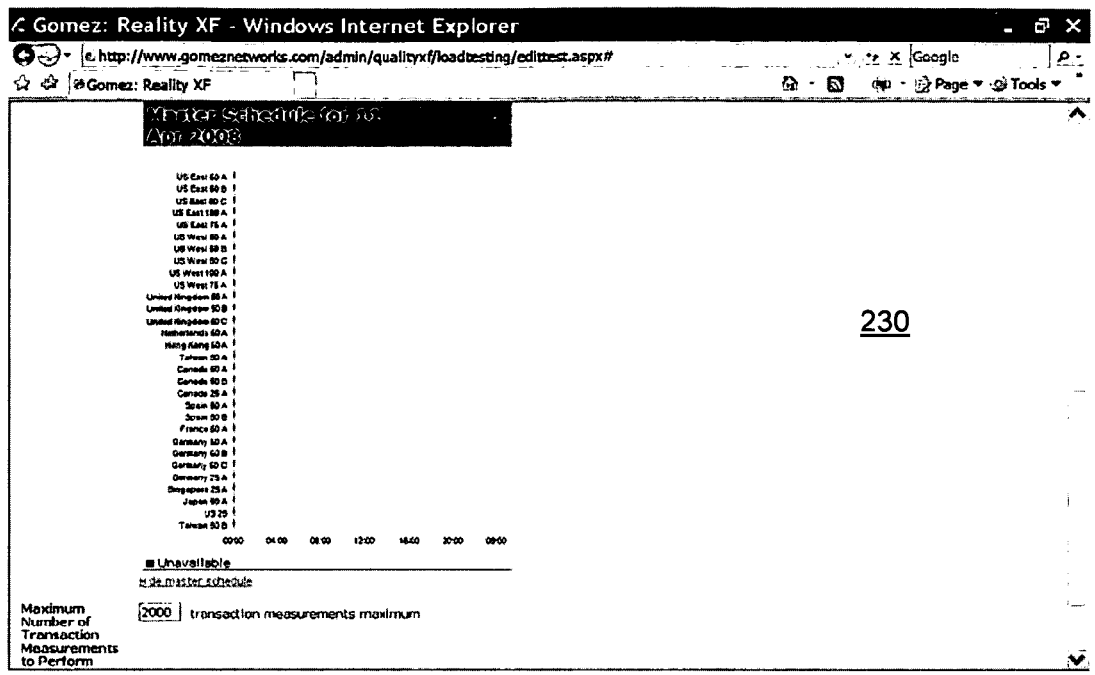

Finally, the agent load testing process 140-2 presents the received data describing the load placed upon the website, step 304. The agent load testing process 140-2 may present this data in any number of ways. For example, as is described below with regards to FIGS. 2F, 2G, and 8, in some embodiments the agent load testing process 140-2 may present the data using one or more graphs. Another possible graph that presents data from a load test is shown in a graph 220 in FIG. 2B. The graph 220 in FIG. 2B is a scatter chart containing various data from an example load test performed by the agent load testing process 140-2 over a window of time on a website. Three distinct types of data are shown in the graph 220. Each individual point charted on the graph 220 is a response time for the load tested website to a particular agent. One line on the graph 220 is representative of the average response time across the window of time. The other line on the graph 220 is representative of concurrent access to the website at a point in time; that is, the number of "hits" (from agents) that occurred simultaneously at a given point in the window of time. The graph 220 may, of course, be presented in any number of ways, and in some embodiments, the information contained in the graph 220 may be spread across more than a single graph. Also, in some embodiments, the data used to create the graph 220 may be independently downloadable, for example into a comma-separate values file, for further analysis and reporting purposes. Further, the agent load testing process 140-2 may present related information along with the graph 220, such as when the load test occurred, and groups of agents used to perform the load test, as shown in FIG. 2B.

In some embodiments, the agent load testing process 140-2 may assign a priority to the load test, such that agents within the plurality of agents that are assigned tasks other than the load test perform the load test prior to performing the other tasks, step 305. This type of priority queuing takes into account that agents included within the plurality of agents may be used for tasks other than load testing, tasks that are scheduled in advance of a load test scheduled by the agent load testing process 140-2. Priority queuing also allows for situations where a load test performed by the agent load testing process 140-2 requires a larger than usual plurality of agents to perform that load test. The assigned priority may allow the agent load testing process 140-2 to use agents that would otherwise be unavailable in order to fulfill the required number of agents in the plurality of agents.

Figure 4:
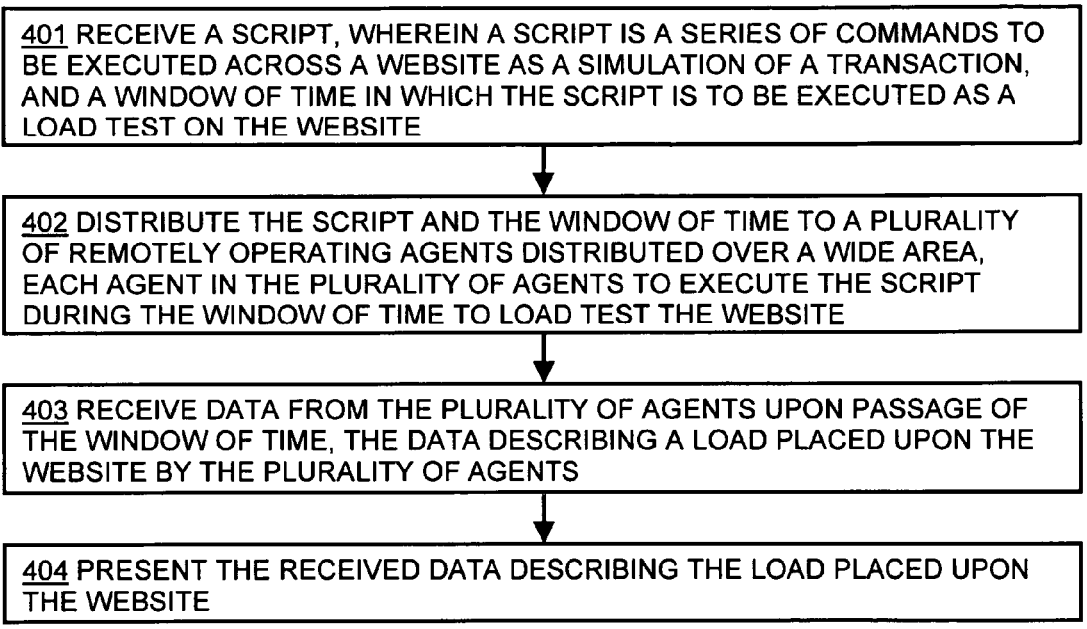
FIG. 4 illustrates a flowchart of a procedure performed by the system of FIG. 1 when load testing a website using a plurality of remotely operating agents, distributed over a wide area, executing a script to simulate a transaction.

FIG. 4 illustrates an example embodiment wherein the agent load testing process 140-2 deals with a series of web pages and commands executed across those web pages in the form of a script. A script allows a user of the agent load testing process 140-2 to load test browsers in the context of a transaction across a series of web pages. A transaction may be any sequence of commands executed across a series of web pages. For example, a transaction may include logging into a user's account at a website such as amazon.com and then searching for and purchasing the current best-selling non-fiction novel. The agent load testing process 140-2 begins this process by receiving a script, wherein a script is a series of commands to be executed across a website as a simulation of a transaction, and a window of time in which the script is to be executed as a load test on the website, step 401. Commands in a script may include providing various input information (i.e., username and password, search query, etc.), moving around within web pages, waiting a period of time before performing a further action, and the like. A user may create a script to be provided to the agent load testing process 140-2 in any number of ways. In some embodiments, a user may download or otherwise make use of a script recording application to create a script for use by the agent load testing process 140-2. Any sequence of steps that a user may take when interacting with a website are capable of being captured and rendered as a script for use by the agent load testing process 140-2.

The agent load testing process 140-2 then distributes the script and the window of time to a plurality of remotely operating agents distributed over a wide area, each agent in the plurality of agents to execute the script during the window of time to load test the website, step 802. This causes the agents that receive the script to execute the series of commands contained within the script, according to the information provided within the script. Thus, using the book purchasing transaction example described above, each agent will go to amazon.com, log in to a user's account, search for a particular book, and then execute the necessary steps to purchase that particular book (i.e., select a shipping rate; provide payment information, etc.). By doing these actions within the particular window of time, a load is placed upon amazon.com. That load generates data, as described above, which is then received by the agent load testing process 140-2 from the plurality of agents upon passage of the window of time, the data describing a load placed upon the website by the plurality of agents, step 403. The agent load testing process 140-2 then presents the received data describing the load placed upon the website, step 404, using any procedures described herein.

Figure 5:
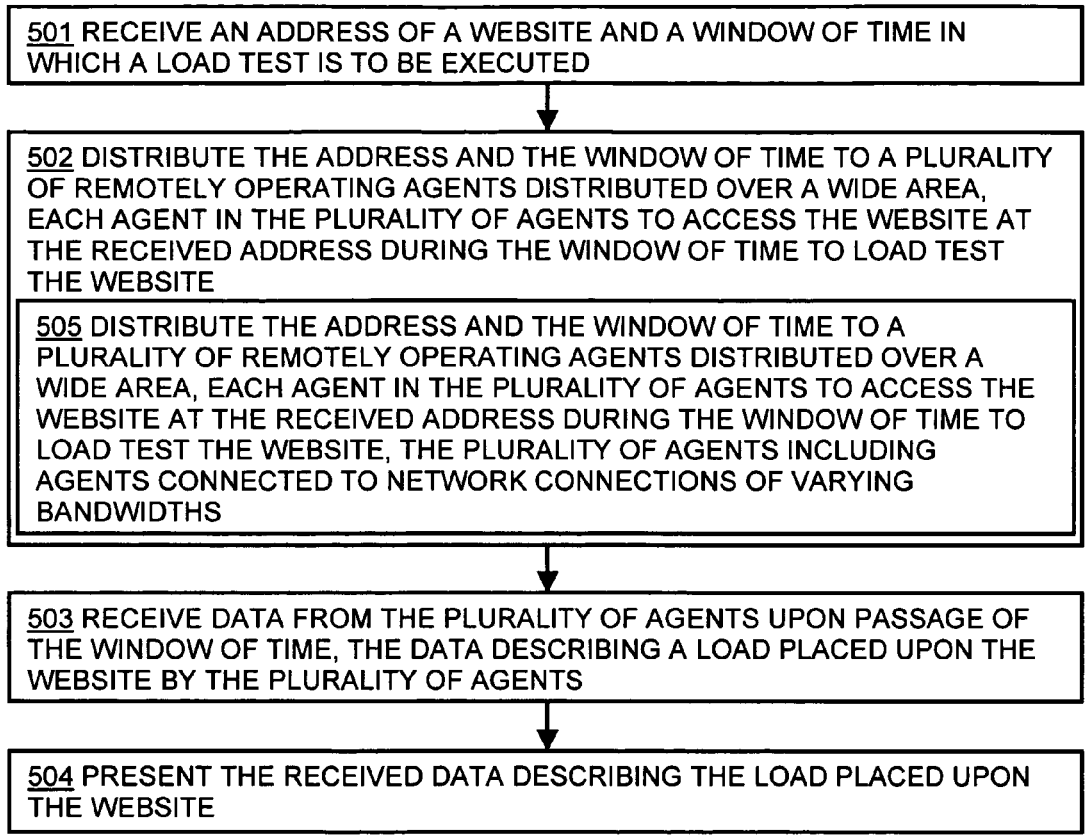
FIG. 5 illustrates a flowchart of a procedure performed by the system of FIG. 1 when load testing a website using a plurality of remotely operating agents distributed over a wide area, including agents connected to network connections of varying bandwidths.

In FIG. 5, the agent load testing process 140-2 uses agents to load test a website where the agents are installed on computer systems that have network connections of varying bandwidths. The agent load testing process 140-2 receives an address of a website and a window of time in which a load test is to be executed, step 501, though in some embodiments, the agent load testing process 140-2 may receive a script instead of an address (see the description of FIG. 4 for more details). The agent load testing process 140-2 then distributes the address and the window of time to a plurality of remotely operating agents distributed over a wide area, each agent in the plurality of agents to access the website at the received address during the window of time to load test the website, step 502. Here, however, the agent load testing process 140-2 distributes the address and the window of time to a plurality of remotely operating agents distributed over a wide area, each agent in the plurality of agents to access the website at the received address during the window of time to load test the website, the plurality of agents including agents connected to network connections of varying bandwidths. The bandwidth of a network connection for an agent (or, more particularly, the computer system on which the agent is located) is simply the amount of data that may be transmitted using that network connection, in this case, from the agent to the website being load tested. As conventional tools typically use agents to load test a website where the agents are all on the same network connection, or otherwise have network connections all of the same bandwidth, in contrast to real-world users of a website, using agents with connections of varying bandwidths thus provides a user of the agent load testing process 140-2 with a more accurate representation of an actual load that may be expected to be placed on the tested website.

The agent load testing process 140-2 then receives data from the plurality of agents upon passage of the window of time, step 503, as described above. The data describes a load placed upon the website by the plurality of agents. This data may show different response times due to different network connections being used by the agents. The agent load testing process 140-2 then, as also described herein, presents the received data describing the load placed upon the website, step 504.

Figure 6:
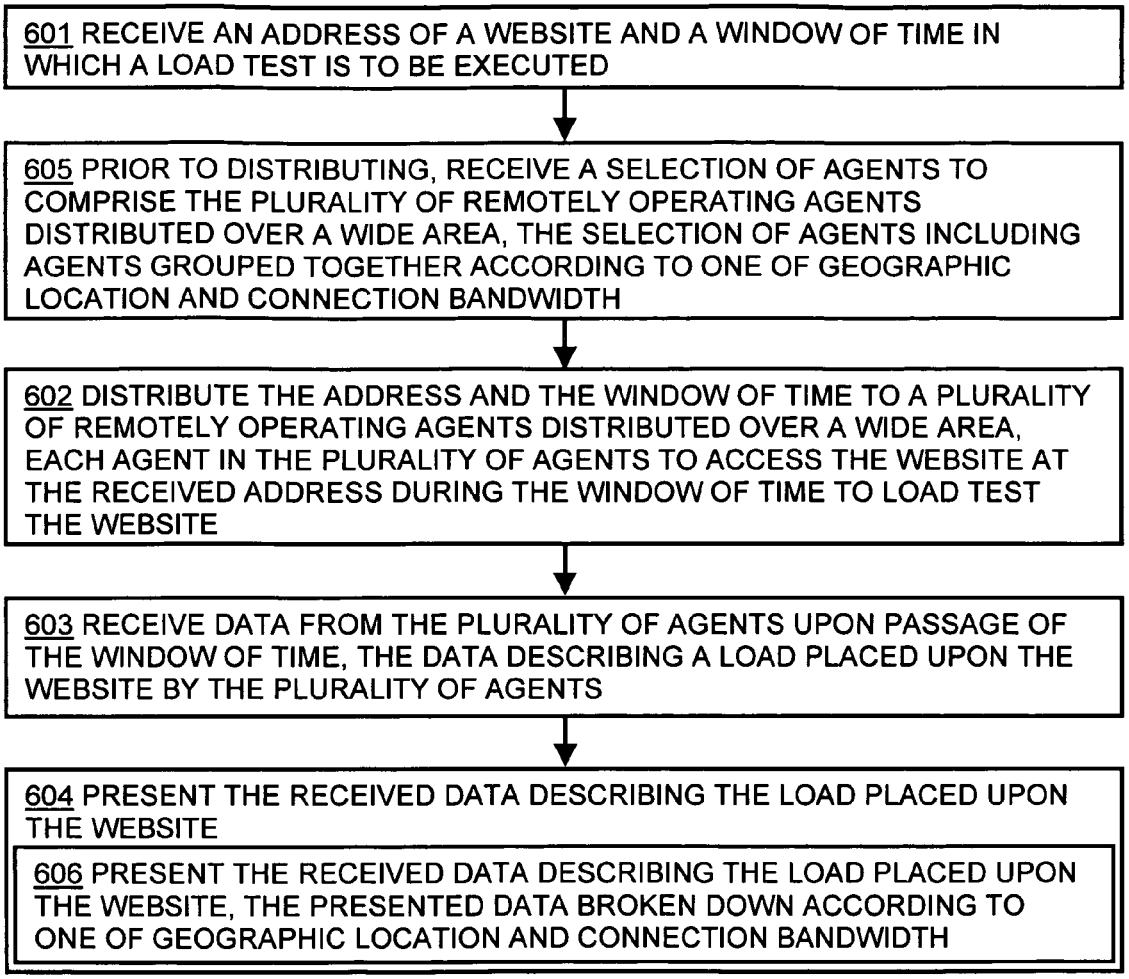
FIG. 6 illustrates a flowchart of a procedure performed by the system of FIG. 1 when load testing a website using a plurality of remotely operating agents distributed over a wide area that are grouped a particular way.

FIG. 6 illustrates an embodiment where agents are grouped by network connection bandwidth, geographic location, or both. The agent load testing process 140-2 first receives an address of a website and a window of time in which a load test is to be executed, step 601. In some embodiments, the agent load testing process 140-2 may alternatively receive a script to be used to load test a website, as s described above with regards to FIG. 4. Prior to distributing this information to the agents, the agent load testing process 140-2 may receive a selection of agents to comprise the plurality of remotely operating agents distributed over a wide area, the selection of agents including agents grouped together according to one of geographic location and connection bandwidth, step 605. These agents may be selected using any process similar to that described above with regards to FIGS. 2A and 3. For example, as shown in FIG. 2A, checkboxes may be placed next to the groupings of agents for a user to select them. The granularity of distinction between geographic locations may be pre-programmed into the agent load testing process 140-2, or may itself be selected by a user of the agent load testing process 140-2. That is, that agent load testing process 140-2 may by default present agents grouped into, for example, agents located in a particular country or in a particular region of a country (i.e., east, west, north, south, etc.). Alternatively, the user may be able to select how agents should be grouped by geographic location. That is, the user may be able to select that agents be grouped by sub-regions of a country, such as states, countries, and the like, or by macro-regions, such as continents and/or sub-continents. The agent load testing process 140-2 will then use agents only located in the selected geographic region(s).

The same process applies to network connections. That is, the agent load testing process 140-2 may, by default, present agents grouped according to various high-speed bandwidth connections (such as cable modem, DSL, fiber optic, and the like). Alternatively, a user may select the granularity of how the agent load testing process 140-2 presents groupings of agents by bandwidth of the connection. That is, the user may request that the agent load testing process 140-2 present agents that have a bandwidth connection of between 1 and 5 Mbps, between 5 and 10 Mbps, and so on, regardless of the type of the connection (i.e., cable, DSL, fiber, etc.). In some embodiments, the groupings of agents may be across both geographic region and bandwidth connection.

The agent load testing process 140-2 will then distribute the address and the window of time to a plurality of remotely operating agents distributed over a wide area, step 602. Each agent in the plurality of agents is to access the website at the received address during the window of time to load test the website, as described herein. Whatever the location of the plurality of agents, or the bandwidth of the network connection that each agent uses, the agent load testing process 140-2 receives data from the plurality of agents upon passage of the window of time, step 603, the data describing a load placed upon the website by the plurality of agents. The agent load testing process 140-2 then presents the received data describing the load placed upon the website, step 604. Here, the agent load testing process 140-2 may present the received data describing the load placed upon the website, the presented data broken down according to one of geographic location and connection bandwidth, step 606. That is, the agent load testing process 140-2 may present data showing the responsiveness of the load tested website to agents located in particular geographic regions, or the responsiveness of the load tested website to agents with a particular type of connection bandwidth, or both.

Figure 7:
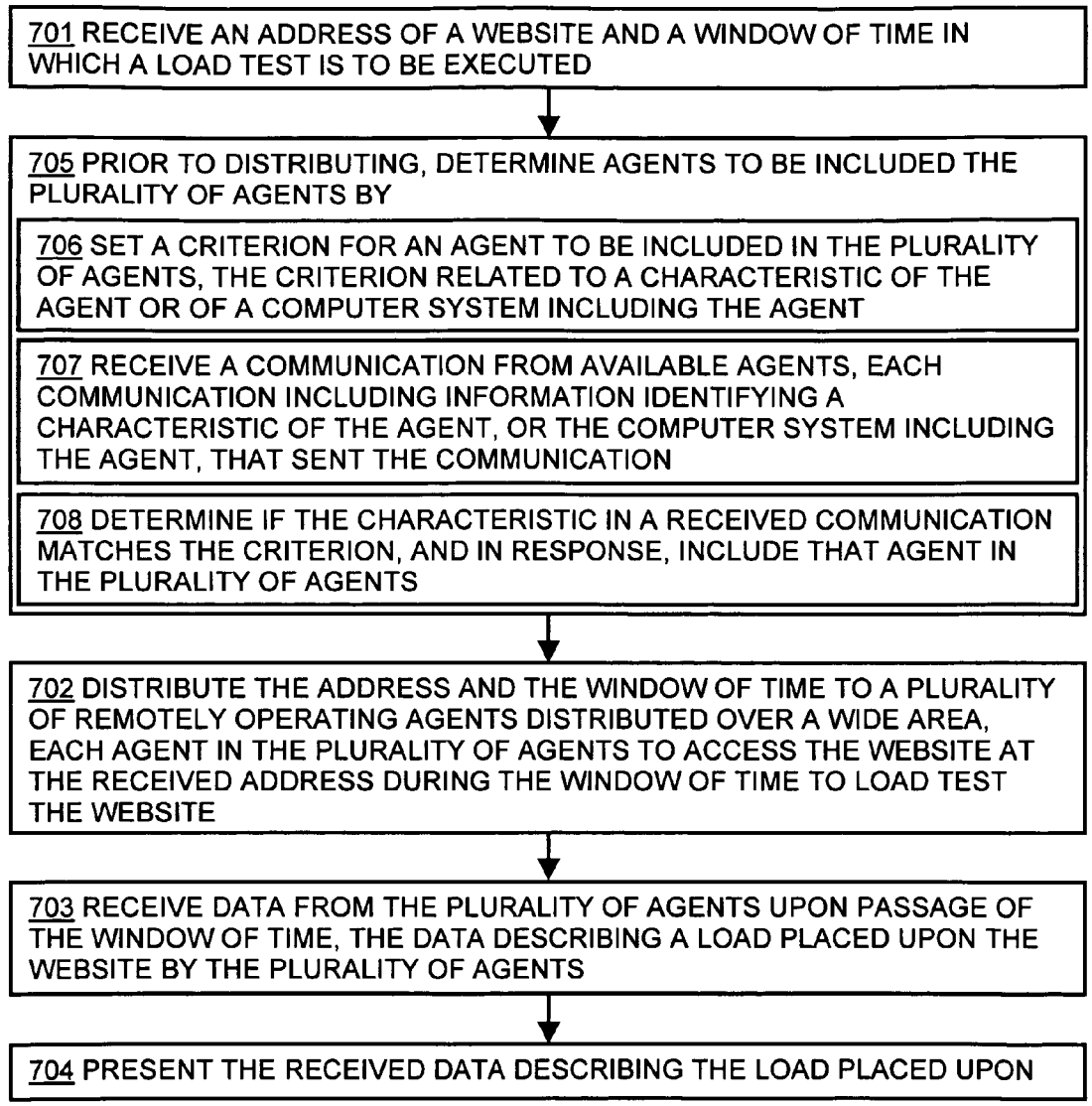
FIG. 7 illustrates a flowchart of a procedure performed by the system of FIG. 1 when load testing a website using a plurality of remotely operating agents distributed over a wide area, some agents chosen according to availability and a criterion.

FIG. 7 illustrates an embodiment wherein the agent load testing process 140-2 determines agents to be included in the plurality of agents by using one or more criteria. The agent load testing process 140-2 first receives an address of a website and a window of time in which a load test is to be executed, step 701, as described herein. Alternatively, in some embodiments, as described above with regards to FIG. 4, the agent load testing process 140-2 may receive a script instead of an address. Prior to distributing the address or the script, and the window of time, the agent load testing process 140-2 may determine agents to be included in the plurality of agents, step 705. The agent load testing process 140-2 may need to determine agents to include in the plurality of agents because a user may have placed restrictions upon the characteristics of agents the user wants to perform the load testing. For example, the user may wish to have agents that are located in a particular geographic region participate in the load test, to simulate expected actual user traffic from that same geographic region.

The agent load testing process 140-2 first sets a criterion for an agent to be included in the plurality of agents, step 706. The criterion is related to a characteristic of the agent or of a computer system including the agent. A criterion may thus describe any possible characteristic of an agent, or a computer system including that agent. In other words, a criterion might be, for example, that the agent be installed on a computer system that has a broadband network connection. Alternatively, a characteristic might be that the agent has no tasks scheduled to be performed at a particular time on a particular day. Of course, the agent load testing process 140-2 may set (and thus use) more than one criterion, with the appropriate repeating of other steps described herein for each other criterion used.

The agent load testing process 140-2 then receives a communication from available agents, step 707. Each communication includes information identifying a characteristic of the agent, or the computer system including the agent, that sent the communication. In some embodiments, the communication received from available agents may be triggered by a first communication sent from the agent load testing process 140-2 to agents. The agent load testing process 140-2 may include in that first communication the criterion for agents the agent load testing process 140-2 wants to include in the plurality of agents. Agents that respond would then know what characteristic to provide to the agent load testing process

140-2. Further, in some embodiments, the agent load testing process 140-2 may verify the characteristic provided by an agent in a communication. For example, if an agent identifies itself (and thus, the computer system on which it is installed) as being located in a particular geographic region, the agent load testing process 140-2 may use the IP address of that agent (and thus of its computer system) to verify its geographic location. In other embodiments, the agent load testing process 140-2 may be pre-configured to use a default criterion that is known to the agents, and thus any agent communicating a characteristic with the agent load testing process 140-2 knows the default criterion, and thus what characteristic to communicate.

Finally, the agent load testing process 140-2 determines if the characteristic in a received communication matches the criterion, and in response, including that agent in the plurality of agents, step 708. Note that the verification process described above may alternatively, in some embodiments, occur during this determination step.

The agent load testing process 140-2 then distributes the address and the window of time to a plurality of remotely operating agents distributed over a wide area, each agent in the plurality of agents to access the website at the received address during the window of time to load test the website, step 702, where the plurality of agents includes agents determined according to the criterion process described above. Finally, the agent load testing process 140-2 receives data from the plurality of agents upon passage of the window of time, the data describing a load placed upon the website by the plurality of agents, step 703, and then presents the received data describing the load placed upon the website, step 704.

Figure 8:
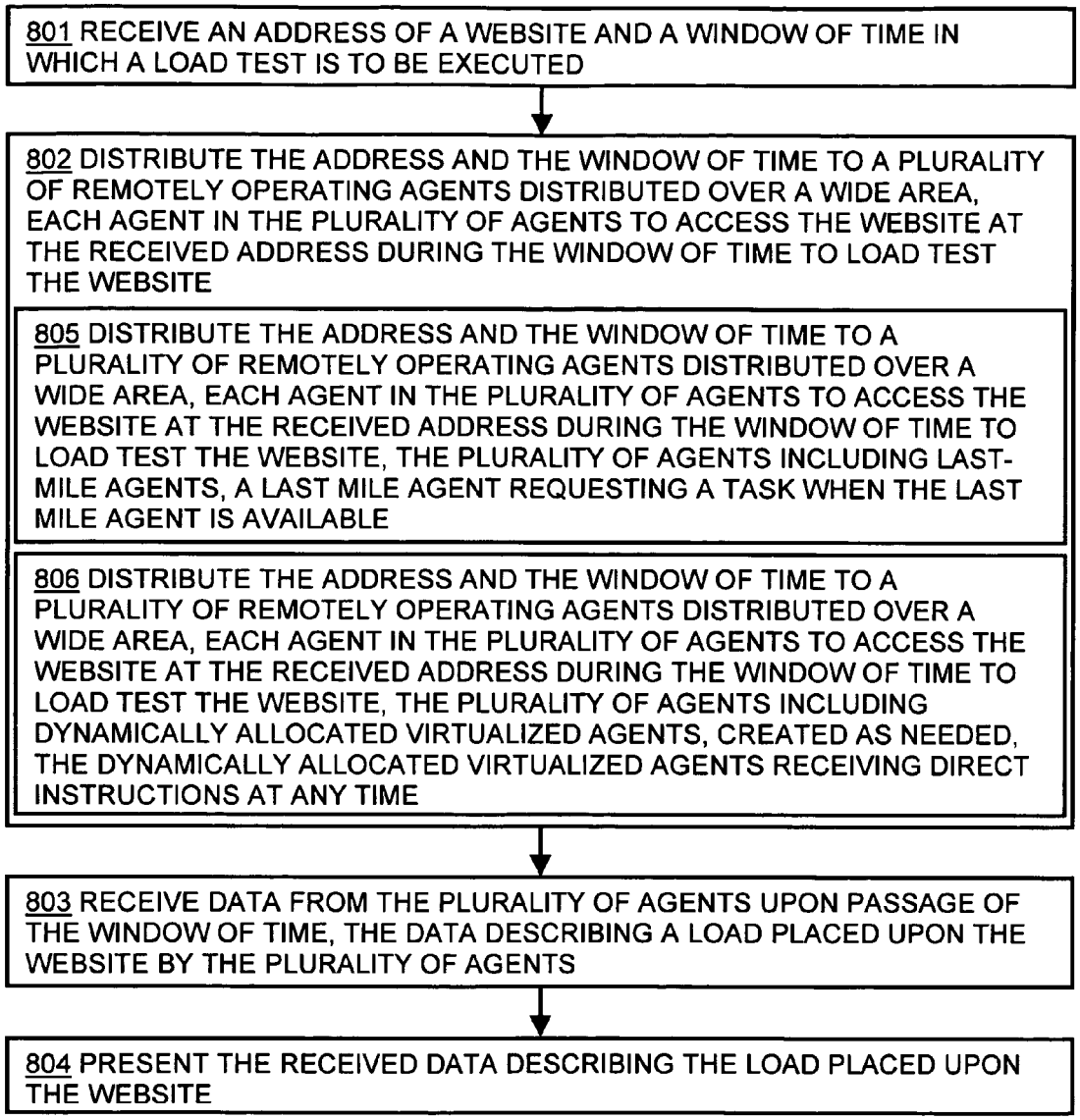
FIG. 8 illustrates a flowchart of a procedure performed by the system of FIG. 1 when load testing a website using a plurality of remotely operating agents distributed over a wide area, including last-mile agents and dynamically-allocated agents.

In FIG. 8, the agent load testing process 140-2 allows the user to select last-mile agents, dynamically allocated agents, or (in some embodiments) both, for use in load testing a website. The agent load testing process 140-2 first receives an address of a website and a window of time in which a load test is to be executed, step 801. Note that, in some embodiments, the agent load testing process 140-2 may alternatively receive a script, such as is described above with regards to FIG. 4. The agent load testing process 140-2 then distributes the address and the window of time to a plurality of remotely operating agents distributed over a wide area, step 802, each agent in the plurality of agents to access the website at the received address during the window of time to load test the website. Alternatively, if the agent load testing process 140-2 receives a script instead of a website address, each agent in the plurality of agents will execute the script during the window of time to load test the website.

As described above with regards to FIGS. 2A and 3, the agent load testing process 140-2 may allow, in some embodiments, a user to select agents to be included in the plurality of agents. In some embodiments, a user may select to include last-mile agents in the plurality of agents. Last-mile agents are agents that are located on a variety of differing computer systems, spread over a wide area. Last mile agents are typically installed at the option of an owner of a private/personal computer system. That owner is distinct from a source of the last-mile agent. Employing last mile agents allows for the use of more realistic network and computer system conditions during load testing, as well as other tasks. For example, some individuals who download and install a last mile agent onto their computer system may use a dial-up connection, while others may use varying types of broadband connections, both residential and commercial. Additionally, some users who download and install a last mile agent may have lower-end computer systems (i.e., small amounts of memory, slow network interface regardless of connection type, slow processor, etc.); some may have high-end computer systems (i.e., the "latest and greatest components", large amounts of memory, many multi-core high-speed processors, etc.); and some may have systems of varying degrees in between those two extremes. Last mile agents allow all those different types of users' computer systems and network connections to be used, by the last mile agent/whatever instructs the last mile agent, for various tasks.

Note that a last mile agent is typically not capable of being directly instructed to perform a particular task at a particular time by the agent load testing process 140-2 (or any other process), because the agent load testing process 140-2 has no control over the computer system on which the last mile agent exists. That is, the computer system including the last mile agent might be, for example, turned off at a time in which the agent load testing process 140-2 is scheduled to perform a load test. In such a situation, even if the agent load testing process 140-2 were to attempt to send instructions to that last mile agent, due to the last mile agent not being active, the last mile agent would not receive those instructions. Thus, a last mile agent must request a task from a process such as the agent load testing process 140-2 when that last mile agent is available. In some embodiments, a last mile agent, when available, will contact a process such as the agent load testing process 140-2 and indicate a window of time in which it is available to perform one or more tasks. The last mile agent may identify itself in any number of ways to the agent load testing process 140-2, and may provide various information to the process, such as its geographic location, network connection type, network service provider, connection bandwidth, information about the computer system on which the last mile agent is installed, and the like. In some embodiments, the agent load testing process 140-2 may be able to determine at least some of such information simply from the current IP address of the last mile agent. If the last mile agent indicates it is available at a time when the agent load testing process 140-2 needs a task performed, the agent load testing process 140-2 may provide that agent with the task at the appropriate time. Thus, when a user indicates that last mile agents should be part of the plurality of agents used to perform a load test, the agent load testing process 140-2 distributes the address and the window of time to a plurality of remotely operating agents distributed over a wide area, each agent in the plurality of agents to access the website at the received address during the window of time to load test the website, the plurality of agents including last-mile agents, a last mile agent requesting a task when the last mile agent is available, step 705.

Last mile agents, by their very nature, may differ greatly in terms of type and speed/bandwidth of network connection, as well as other characteristics (e.g., geographic location), as may be seen from the above description. A user may thus place one or more particular restrictions on the types of last mile agents the agent load testing process 140-2 may include in the plurality of agents for a load test. In some embodiments, the agent load testing process 140-2 may use the criterion selection process described above with regards to FIG. 6 to find last mile agents that meet such restrictions indicated by a user. Alternatively, in embodiments where a user has placed no restrictions other than the number of last mile agents to be used, the agent load testing process 140-2 may simply wait to receive communications from enough last mile agents, indicating those agents will be available at the time of the load test, to satisfying the number requirement of the user. When that number is reached, the agent load testing process 140-2 no longer includes further last mile agents in the plurality of agents.

Another particular type of agent that a user is able to select for inclusion in the plurality of agents is a dynamically allocated agent. In some situations, it may be useful for a user to have more direct control over agents than is available with last mile agents. Particularly, it may be useful to have more direct control over a large number of agents that are distributed over a wide area. In such situations, the agent load testing process 140-2 is able to dynamically create agents on-demand that are, unlike last mile agents, under centralized control from the moment of their instantiation until they are no longer needed. Such agents are known herein as dynamically allocated agents.

Dynamically allocated agents are created using virtualization processes. Instead of having, in the case of last mile agents, thousands of private individual users downloading the last mile agent software to their individual private machines, the agent load testing process 140-2 may create thousand of virtual agents within physical hardware devices distributed around the world. The agent load testing process 140-2 need not have access to thousands of actual computer systems but rather may need a much smaller number, each capable of instantiating some type of virtualware process that results in the creation of virtual agents whenever the agent load testing process 140-2 needs such agents.

Figure 2D:
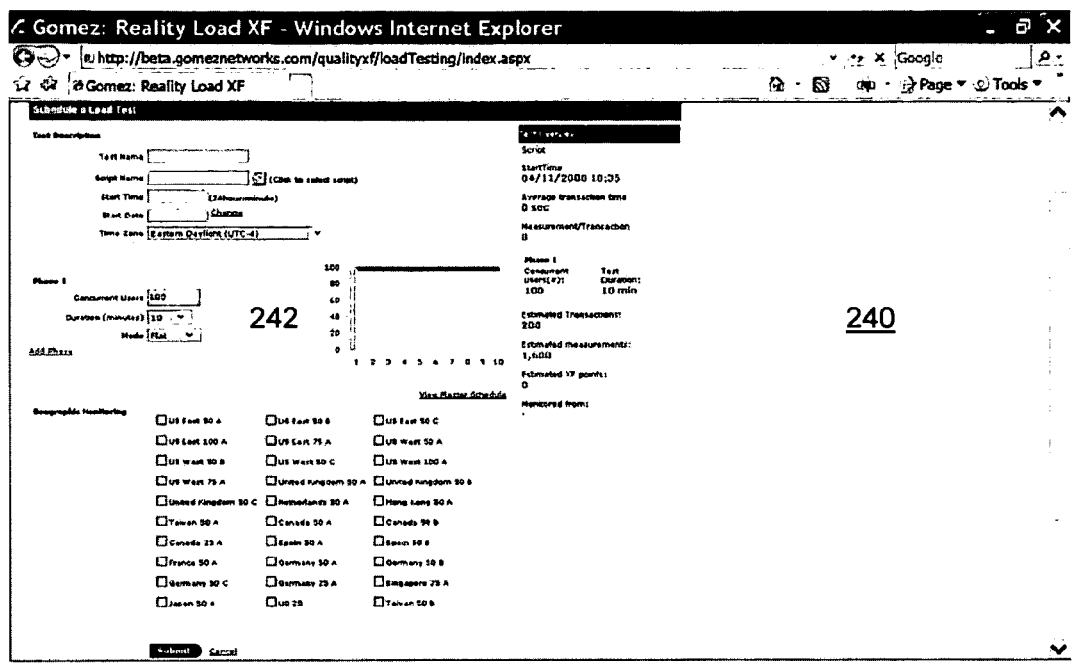
Figure 2E:
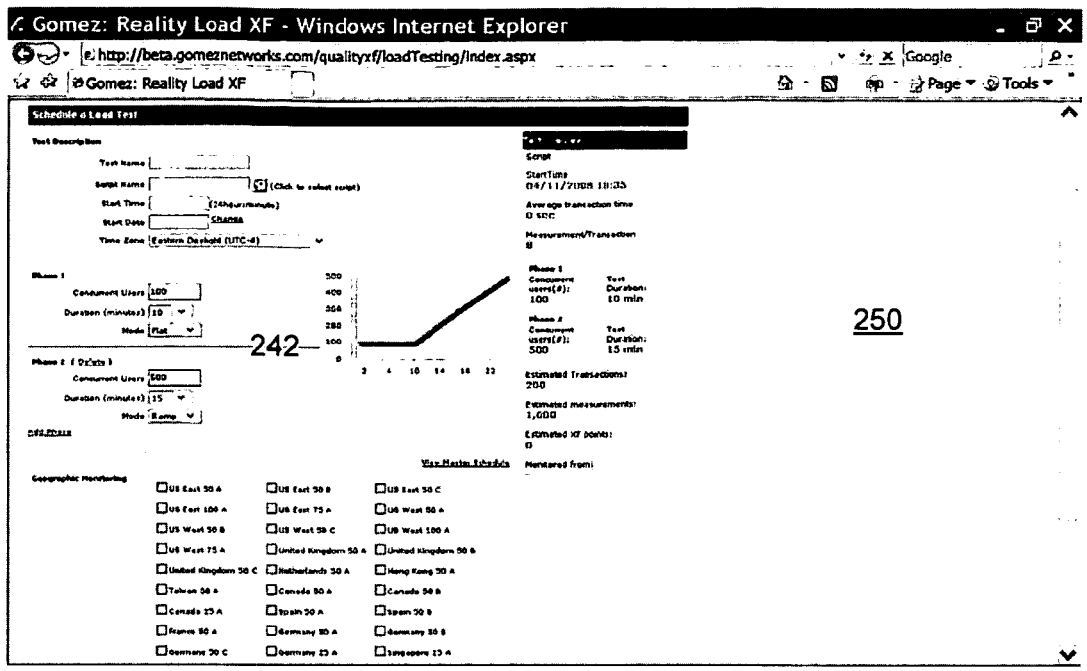

Any number of dynamically allocated agents may be created at any one time. For example, a user may, for example, desire to schedule a load test using the agent load testing process 140-2 by having 200 agents place a load on a website in a ten minute window of time, and then having 1000 place a load on the same website immediately after for another ten minute window of time. The agent load testing process 140-2 is able to achieve this by using dynamically allocated agents. That is, the agent load testing process 140-2 distributes the address and the window of time to a plurality of remotely operating agents distributed over a wide area, each agent in the plurality of agents to access the website at the received address during the window of time to load test the website, the plurality of agents including dynamically allocated virtualized agents, created as needed, the dynamically allocated virtualized agents receiving direct instructions at any time, step 806. FIGS. 2D-E show example screenshots where a user is able to, in addition to (or in alternative to) selecting last mile agents of a particular type and geographic location, instruct the agent load testing process 140-2 to create varying numbers of dynamically allocated agents to act at different periods of time. For example, as shown in FIG. 2D, a user may select, in a selection area 242 of a graphical user interface 240, to have one hundred concurrent users (i.e., dynamically allocated agents) place a load on a website (either directly, or through use of a script) for a ten minute duration of time (i.e., window of time), during which the hundred agents all act continually throughout that window of time. Alternatively, as shown in FIG. 2E, a user may select, in a selection area 242 of a graphical user interface 250, to first have one hundred concurrent agents place a load on a website for a ten minute duration of time, and then ramp up to five hundred concurrent agents over a successive fifteen minute duration of time. The more direct control the agent load testing process 140-2 (and, correspondingly, a user) has over dynamically allocated agents allows for such combinations. Of course, the combinations shown in FIGS. 2D and 2E are just examples and other combinations (involving further phases, that is, successive durations of time) are also possible. It would typically not be possible for the agent load testing process 140-2 to use last mile agents in such a fashion, due to the lack of more direct control the agent load testing process 140-2 has over last mile agents. That is, whereas with dynamically allocated agents, the agent load testing process 140-2 has control over whether those agents are "on" or not, and when they turn on, the agent load testing process 140-2 has no such control over last mile agents. Each individual user on whose machine a last mile agent may reside may, at any time, decide to turn the machine (and thus its last mile agent) off.

Whatever agents a user chooses to include in the plurality of agents, the agent load testing process 140-2 receives data from the plurality of agents upon passage of the window of time, the data describing a load placed upon the website by the plurality of agents, step 803, as described herein. The agent load testing process 140-2 then presents the received data describing the load placed upon the website, step 804. In embodiments where the plurality of agents includes dynamically allocated agents, the agent load testing process 140-2 may present a variety of graphs on a graphical user interface, such as the graphical user interface 270 shown in FIG. 2F or the graphical user interface 280 shown in FIG. 2G. The graphs describe the received load testing data. These graphs may include, but are not limited to, a graph 260 of the number of virtual "users" (i.e., dynamically allocated agents) performing the load test at various points in time during the window of time. For any given point in time during the window of time, the graph 260 indicates the target number of virtual users and the actual number of virtual users performing the load test. The agent load testing process 140-2 may also present a graph 262 of the number of transactions (i.e., hits on the load tested website) in light of the response time during the window of time. The agent load testing process 140-2 may also present a graph 264 of the page errors and object errors that occur during the load test occurring in the window of time. Page errors occur when one or more agents encounter an error or errors in attempting to access a web page that is part of the website being load tested (e.g., an HTTP 404 Page Not Found error). Object errors occur when one or more agents encounter an error or errors in attempt to acquire one or more objects that are embedded within a web page that is part of the website being load tested (e.g., an image file that is not found). Finally, the agent load testing process 140-2 may present a graph 266 (not shown in FIG. 2G) of response time by step. Of course, the agent load testing process 140-2 may present other data regarding the load test, either related or unrelated to the data encompassed by any presented graph(s), concurrently with any such graph(s).

Figure 2F:
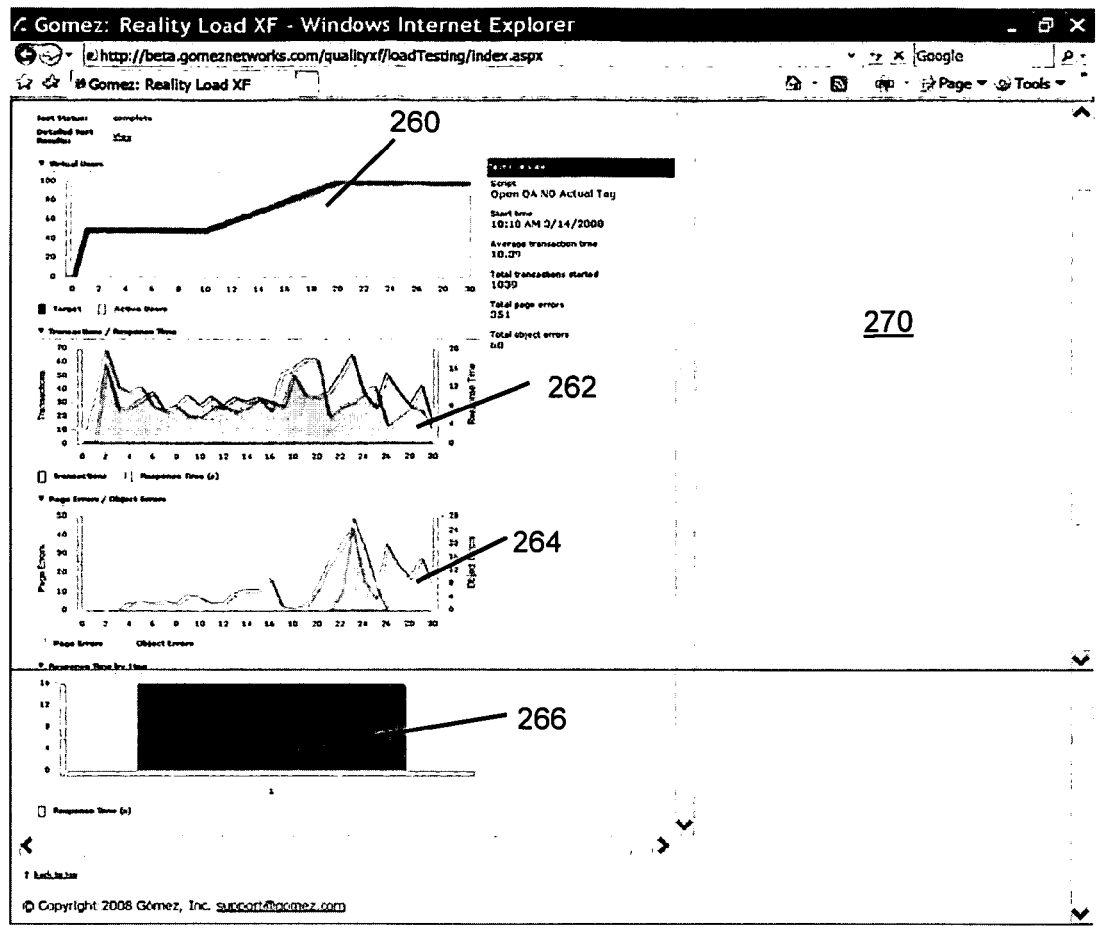
Figure 2G:
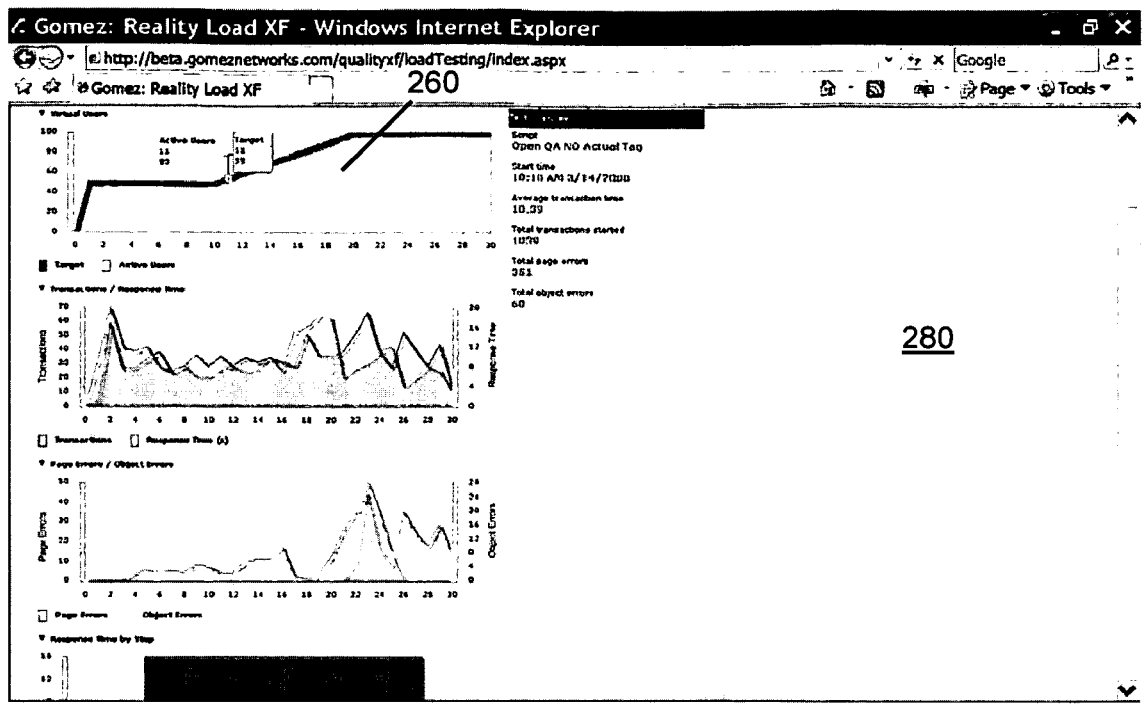

In some embodiments, as is shown in a graphical user interface 280 shown in FIG. 2G, for the graph 260, a user may be able to manipulate a cursor icon or other graphical icon (for example, through manipulation of an input device) to any point on any of the graphs shown in FIGS. 2F and 2G to get a clear presentation of the data at that point in time through a popup graphic that provides the data. In the example shown in FIG. 2G, the graph 260, when a cursor (shown as a dot within a circle, but capable of taking any form) is placed on the graph of the lines at the point corresponding to 11 in terms of duration of time (shown along the x-axis of the graph 260), a popup icon shows that the target number of virtual users for that point in time was 55, and the actual number of virtual users for that point in time was also 55. If a user were to manipulate the cursor in either direction along the lines of the graph 260, the popup icon would correspondingly change to show the data at the point.

In some embodiments, a user may desire to use the agent load testing process 140-2 to load test a website that is not yet public (i.e., pages published on the public Internet/World Wide Web). For example, seeing how a website handles a particular load of traffic may have value to the company planning on making the website public for operation, in that, if the website (or, more particularly, the network components serving the website) is not capable of handling an estimated traffic load, or does not handle such a load efficiently, changes may need to be made. Such a website is typically located behind a firewall, or otherwise stored within a private network and unaccessible via the public Internet. That is, if the agent load testing process 140-2 were to instruct agents to attempt to retrieve that website, they would not be able to unless the agents were configured to have access to the content. In such situations, a user may download or otherwise acquire a security agent application to run on their private local computer system/network that will allow the agents instructed by the agent load testing process 140-2 to access content stored thereon that is otherwise non-publicly accessible. When this agent security application executes as an agent security process, it opens one or more ports in a firewall of the private network so that traffic initiated by agents instructed by the agent load testing process 140-2 may get to the private content comprising the website. The agent security process also acts as a proxy so as to tunnel requests for the website from agents through the open port(s) to the private network where that private content is stored. Thus, the agent security process includes both a proxy-like component and a tunneling component, both of which must be activated in order to access otherwise private content. In such embodiments, the agent load testing process 140-2 is configured to see if such an agent security process is executing, and if so, it will take information provided by the agent security process (e.g., information about the tunnel connection and the proxy), and include it within the instructions to the plurality of agents. If the agent security process is not executing, the agent load testing process 140-2 performs as described herein.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, flash memory (i.e., solid state memory) device, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Those skilled in the art may make many additional changes in the details, materials, and arrangement of parts, herein described and illustrated.

What is claimed is:

1. A method of user-directed load testing of a website using a plurality of agents, the method comprising:
   receiving, by a hardware processor and from a user, an address of a website and a window of time during which a load test is to be executed;
   distributing the address and the window of time received from the user to a plurality of agents operating remotely from the user and distributed over a wide area, with instructions for each of the plurality of agents to access the website at the address during the window of time to execute the load test of the website;
   receiving data from the plurality of agents upon passage of the window of time, the data collectively describing a load placed upon the website by the plurality of agents executing the load test;
   presenting to the user the data describing the load placed upon the website;
   wherein the window of time received from the user comprises a plurality of successive durations of time; and
   prior to the distributing, receiving from the user a number of concurrent agents and a test mode for each of the plurality of successive durations of time.

2. The method of claim 1, wherein
   the instructions comprise a script with a series of commands to be executed across the website as a simulation of a transaction.

3. The method of claim 1, further comprising:
   prior to distributing, receiving from the user a selection of agents to comprise the plurality of agents operating remotely from the user and distributed over a wide area, the received selection of agents including agents grouped together according to one of geographic location and connection bandwidth.

4. The method of claim 3, wherein
   the data describing the load placed upon the website is broken down according to one of geographic location and connection bandwidth.

5. The method of claim 1, wherein
   the plurality of agents includes agents connected to network connections of varying bandwidths.

6. The method of claim 1, further comprising:
   prior to distributing, determining agents to be included in the plurality of agents by:
      setting a criterion for an agent to be included in the plurality of agents, the criterion related to a characteristic of the agent or of a computer system including the agent;
      receiving a communication from available agents, each communication including information identifying a characteristic of the agent, or the computer system including the agent, that sent the communication;
      in response to determining if the characteristic in a received communication matches the criterion, including that agent in the plurality of agents.

7. The method of claim 1 wherein
   the plurality of agents comprises last-mile agents, each last mile agent requesting a task when the last mile agent is available.

8. The method of claim 1, wherein
   the plurality of agents comprises dynamically allocated virtualized agents, created as needed, the dynamically allocated virtualized agents capable of receiving direct instructions at any time.

9. The method of claim 1, further comprising:
   assigning a priority to the load test such that agents within the plurality of agents that are assigned tasks other than the load test perform the load test prior to performing the other tasks.

10. The method of claim 1, further comprising:
    prior to receiving the address of the website and the window of time, presenting a display of already-scheduled load tests, the display assisting in determining the window of time for the load test to be executed.

11. A computer program product, stored on a non-transitory computer storage medium, for user-directed load testing of a website using a plurality of agents, the computer program product executing instructions comprising:
    receiving from a user an address of a website and a window of time during which a load test is to be executed;
    distributing the address and the window of time received from the user to a plurality of agents operating remotely from the user and distributed over a wide area, with instructions for each of the plurality of agents to access the website at the address during the window of time to execute the load test of the website;
    receiving data from the plurality of agents upon passage of the window of time, the data collectively describing a load placed upon the website by the plurality of agents;
    presenting to the user the data describing the load placed upon the website;
    wherein the window of time received from the user comprises a plurality of successive durations of time; and
    prior to the distributing, receiving from the user a number of concurrent agents and a test mode for each of the plurality of successive durations of time.

12. The computer program product of claim 11, wherein
    the instructions for each of the plurality of agents comprise a script with a series of commands to be executed across the website as a simulation of a transaction.

13. The computer program product of claim 11, wherein
    the plurality of agents includes agents connected to network connections of varying bandwidths.

14. The computer program product of claim 11, wherein
    the plurality of agents comprises last-mile agents, each last mile agent requesting a task when the last mile agent is available.

15. The computer program product of claim 11, wherein
    the plurality of agents comprises dynamically allocated virtualized agents, created as needed, the dynamically allocated virtualized agents capable of receiving direct instructions at any time.

16. A computer system, comprising:
    a memory;
    a processor; and
    an interconnection mechanism coupling the memory and the processor, allowing communication there between;
    wherein the memory of the computer system is encoded with an agent load testing application, that when executed in the processor, provides a user-directed agent load testing process that load tests a website using a plurality of agents, by causing the computer system to perform operations of:

receiving from a user an address of a website and a window of time during which a load test is to be executed;

distributing the address and the window of time received from the user to a plurality of agents operating remotely from the user and distributed over a wide area, with instructions for each of the plurality of agents to access the website at the address during the window of time to execute the load test of the website;

receiving data from the plurality of agents upon passage of the window of time, the data collectively describing a load placed upon the website by the plurality of agents executing the load test; and a display for presenting to the user the data describing the load placed upon the website;

wherein the window of time received from the user comprises a plurality of successive durations of time; and prior to the distributing, receiving from the user a number of concurrent agents and a test mode for each of the plurality of successive durations of time.

17. The computer system of claim 16, wherein
the instructions comprise a script with a series of commands to be executed across the website as a simulation of a transaction.

18. The computer system of claim 16, wherein
the plurality of agents includes agents connected to network connections of varying bandwidths.

19. The computer system of claim 16, wherein
the plurality of agents comprises last-mile agents, each last mile agent requesting a task when the last mile agent is available.

20. The computer system of claim 16, wherein
the plurality of agents comprises dynamically allocated virtualized agents, created as needed, the dynamically allocated virtualized agents capable of receiving direct instructions at any time.

21. The method of claim 1, further comprising, prior to distributing, displaying to the user a graphical display of the load test showing the plurality of successive durations of time.

22. The method of claim 1, further comprising:
prior to distributing, receiving from the user a target number of concurrent agents for the load test; and
wherein the data presented to the user comprises a graphical display showing, for a timeline spanning the window of time, the received target number of concurrent agents and an actual number of concurrent agents.

23. The method of claim 22, further comprising, in response to user manipulation of a cursor to a selected point on the timeline, displaying to the user the target number of users and actual number of users at the selected point on the timeline.

* * * * *